(12) United States Patent
Kalavrouziotis et al.

(10) Patent No.: US 12,541,060 B2
(45) Date of Patent: Feb. 3, 2026

(54) OPTICAL COMMUNICATION DEVICES WITH SELECTIVE SIGNAL PRECLUSION

(71) Applicant: Mellanox Technologies, Ltd., Yokneam (IL)

(72) Inventors: Dimitrios Kalavrouziotis, Papagou (GR); Elad Mentovich, Tel Aviv (IL); Paraskevas Bakopoulos, Ilion (GR)

(73) Assignee: Mellanox Technologies, Ltd., Yokneam (IL)

( * ) Notice: Subject to any disclaimer, the term of this patent is extended or adjusted under 35 U.S.C. 154(b) by 180 days.

(21) Appl. No.: 17/900,490

(22) Filed: Aug. 31, 2022

(65) Prior Publication Data

US 2024/0053542 A1    Feb. 15, 2024

(30) Foreign Application Priority Data

Aug. 12, 2022  (GR) .................................. 220100687

(51) Int. Cl.
*H04B 10/532* (2013.01)
*G02B 6/293* (2006.01)
*H04B 10/50* (2013.01)

(52) U.S. Cl.
CPC ..... *G02B 6/29302* (2013.01); *G02B 6/29344* (2013.01); *G02B 6/29395* (2013.01); *H04B 10/501* (2013.01); *H04B 10/532* (2013.01)

(58) Field of Classification Search
CPC ............................ H04B 10/501; H04B 10/532
See application file for complete search history.

(56) References Cited

U.S. PATENT DOCUMENTS

| | | | | |
|---|---|---|---|---|
| 5,740,288 A | * | 4/1998 | Pan .................. | G02B 6/2773 349/196 |
| 6,427,033 B1 | * | 7/2002 | Hait ................. | G02B 6/2766 385/11 |
| 2001/0009595 A1 | * | 7/2001 | Okuno .............. | G02B 6/125 385/11 |
| 2004/0165888 A1 | * | 8/2004 | Gerstel ............. | H04J 14/02 398/45 |

(Continued)

FOREIGN PATENT DOCUMENTS

JP         2000-28370    *   1/2000   ............. G01C 19/72

OTHER PUBLICATIONS

"Polyimide Waveplate". 2000 NTT Advanced Technology Corporation, [online]. Retrieved from the internet < https://www.ntt-at.com/product/Waveplate/>.

*Primary Examiner* — Nathan M Cors
(74) *Attorney, Agent, or Firm* — Moore & Van Allen PLLC; Michael M. McCraw (57) ABSTRACT

Optical communication devices and associated methods of manufacturing are provided. An example optical communication device includes a substrate defining a first end and a second end. The optical communication device also includes a primary optical communication medium attached to the second end and a secondary optical communication medium attached to the second end. The optical communication device further includes a signal preclusion component supported by the substrate that selectively preclude signal transmission of optical signals received via the first end to either the primary optical communication medium or the secondary optical communication medium.

11 Claims, 7 Drawing Sheets

(56) References Cited

U.S. PATENT DOCUMENTS

| | | | |
|---|---|---|---|
| 2008/0031566 A1* | 2/2008 | Matsubara | G02B 6/126 385/14 |
| 2008/0152291 A1* | 6/2008 | Graff | G02B 6/4471 385/135 |
| 2009/0290829 A1* | 11/2009 | Kuratani | G02F 1/225 385/2 |

* cited by examiner

OPTICAL COMMUNICATION DEVICES WITH SELECTIVE SIGNAL PRECLUSION

CROSS-REFERENCE TO RELATED APPLICATIONS

This application claims priority to Greek Patent Application No. 20220100687, filed Aug. 12, 2022, the entire contents of which application are hereby incorporated herein by reference.

TECHNOLOGICAL FIELD

Example embodiments of the present disclosure relate generally to communication systems and, more particularly, to networking communication modules with selective signal preclusion.

BACKGROUND

Datacenters and other networking environments (e.g., datacom, telecom, and/or other similar data/communication transmission networks) may include connections between switch systems, servers, racks, and other devices in order to provide for signal transmission between one or more of these elements. In some instances, optical communication devices, modules, transceivers, etc. may be used that leverage optical signals and optical fibers to provide this communication. Emerging manufacturing techniques, such as optical fiber welding, used to create these communication devices present unique opportunities and challenges. Applicant has identified a number of deficiencies and problems associated with conventional optical communication devices and associated methods of manufacturing. Through applied effort, ingenuity, and innovation, many of these identified problems have been solved by developing solutions that are included in embodiments of the present disclosure, many examples of which are described in detail herein.

BRIEF SUMMARY

Apparatuses, systems, methods, and computer program products are provided for improved optical communication devices with selective signal preclusion. An example optical communication device may include a substrate defining a first end and a second end. The optical communication device may further include a primary optical communication medium attached to the second end and a secondary optical communication medium attached to the second end. The optical communication device may further include a signal preclusion component supported by the substrate and configured to selectively preclude signal transmission of optical signals received via the first end to either the primary optical communication medium or the secondary optical communication medium.

In some embodiments, the primary optical communication medium and the secondary optical communication medium may be welded to the second end of the substrate.

In some embodiments, the signal preclusion component may include a thin-film element.

In some further embodiments, the substrate may further define a slot between the first end and the second end within which the thin-film element is disposed.

In some further embodiments, the primary optical communication medium may be associated with a primary polarization of the signal preclusion component, and the secondary optical communication medium may be associated with a secondary polarization of the signal preclusion component. In such an embodiment, the signal preclusion component may be further configured to selectively preclude transmission of optical signals to the primary optical communication medium by setting the polarization of the signal preclusion component to the secondary polarization associated with the secondary optical communication medium. In such an embodiment, the thin-film element may include a polyimide half waveplate.

In some further embodiments, the signal preclusion component may be configured to selectively preclude transmission of optical signals to the secondary optical communication medium by setting the polarization of the signal preclusion component to the primary polarization associated with the primary optical communication medium. In such an embodiment, the thin-film element may include a zero-degree waveplate.

In some other embodiments, the primary optical communication medium may be associated with a primary state of the signal preclusion component set by a primary phase difference, and the secondary optical communication medium may be associated with a secondary state of the signal preclusion component set by a secondary phase difference. In such an embodiment, the signal preclusion component may be further configured to selectively preclude transmission of optical signals to the primary optical communication medium by selecting the secondary phase difference and setting the preclusion component to the secondary state associated with the secondary optical communication medium.

In some further embodiments, the signal preclusion component may be further configured to selectively preclude transmission of optical signals to the secondary optical communication medium by selecting the primary phase difference and setting the preclusion component to the primary state, associated with the primary optical communication medium.

In some embodiments, the signal preclusion component may include a plurality of control heaters including at least a first control heater and a second control heater.

In some further embodiments, the primary optical communication medium may be associated with a primary state of the signal preclusion component set by a primary phase difference, and the secondary optical communication medium may be associated with a secondary state of the signal preclusion component set by a secondary phase difference. In such an embodiment, the signal preclusion component may be further configured to selectively preclude transmission of optical signals to the primary optical communication medium by, via the control heaters, selecting the secondary phase difference and setting the preclusion component to the secondary state associated with the secondary optical communication medium.

In some further embodiments, the signal preclusion component may be further configured to selectively preclude transmission of optical signals to the secondary optical communication medium by, via the control heaters, selecting the primary phase difference and setting the preclusion component to the primary state associated with the primary optical communication medium.

In some still further embodiments, the optical communication device may further include a computing device operably coupled with the signal preclusion component and configured to actively control operation of the plurality of control heaters.

In some embodiments, the signal preclusion component may include a multimode interference (MMI) coupler configured to passively direct the optical signals to either the primary optical communication medium or the secondary optical communication medium.

An example method of manufacturing an optical communication device may include providing a substrate defining a first end and a second end. The method may include attaching a primary optical communication medium to the second end and attaching a secondary optical communication medium to the second end. The method may include supporting a signal preclusion component by the substrate, the signal preclusion component configured to selectively preclude signal transmission of optical signals received via the first end to either the primary optical communication medium or the secondary optical communication medium.

In some embodiments, prior to supporting the signal preclusion component, the method may further include performing a testing procedure on the primary optical communication medium and selecting the signal preclusion component based upon the testing procedure.

In some embodiments, the signal preclusion component may include a thin-film element configured to selectively preclude signal transmission based upon a phase difference or a polarization set by the signal preclusion component.

In some embodiments, the signal preclusion component may include a plurality of control heaters including at least a first control heater and a second control heater configured to selectively preclude signal transmission set by the signal preclusion component.

In some embodiments, the signal preclusion component may include a multimode interference (MMI) coupler configured to passively direct the optical signals to either the primary optical communication medium or the secondary optical communication medium.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As noted above and described hereafter, networking systems, such as those found in datacenters, may establish inter-rack connections between racks and intra-rack connections between networking boxes, printed circuit boards (PCBs), and the like located within the same rack. These connections often rely upon transceivers, processors, chipsets, PCBs, connectors, networking cables, optical cable assemblies, copper cable assemblies, and associated communication system components to establish these connections. For example, optical communication devices, optical modules, photonic integrated circuits (PICs), and/or the like may be used as components in networking systems in order to establish optical communication links between system devices. By way of a particular example, a PIC may include an optical communication medium (e.g., an optical fiber or the like) attached to a substrate (e.g., printed circuit board (PCB) or the like) that may (1) receive optical signals from the PIC (e.g., from optical components supported by or coupled with the PIC) and/or (2) transmit optical signals to the PIC (e.g., from optical components attached to an opposite end of the optical communication medium).

In conventional optical communication devices, such as PICs, various optoelectronic components are secured to the device via adhesive-based techniques. By way of example, a PIC may have an optical fiber attached thereto by a glue or equivalent adhesive that is subsequently cured (e.g., via ultraviolet radiation or the like) to affix the optical fiber to the PIC. These adhesive-based techniques, however, are often heat sensitive in that subjecting the adhesive to an increased temperature, such as during a reflow procedure, may result in detachment of the optical fiber from the PIC. In this way, conventional adhesive-based connection techniques represent a rigid mechanism for attempting to secure optical communication mediums to corresponding optical communication devices.

In order to address these issues and others, the embodiments of the present disclosure may leverage emerging manufacturing techniques, such as laser welding, to attach optical fibers to optical communication devices. These laser welding techniques may be more resistant or insensitive to relatively high temperatures as compared to adhesive-based techniques, thereby allowing the optical communication device to undergo further temperature intensive operations (e.g., reflow procedures or the like) after the optical fibers are attached thereto. Furthermore, laser welding techniques provide localized heat for attachment of these optical fibers not found in adhesive-based applications. Due to the novel nature of these laser welding techniques, however, current manufacturing processes that employ these techniques may require further advancement in order to consistently apply these laser welding techniques in the generation of optical communication devices.

As described herein, the embodiments of the present disclosure may therefore provide selective signal preclusion between multiple optical communication mediums (e.g., optical fibers) to ensure that optical communication devices that leverage laser welded optical fibers provide redundancy or resilience for unintended optical fiber failure. By way of example, the optical communication devices described herein may include a primary optical communication medium (e.g., a primary optical fiber) and a secondary optical communication medium (e.g., a secondary optical fiber) attached to a substrate of the device. A testing procedure may be deployed to detect instances in which the primary optical communication medium is unsuitable for use. In response, a signal preclusion component of the optical communication device may selectively preclude optical communication to the primary optical communication medium, thereby establishing optical communication with the secondary optical communication medium. In doing so, the embodiments described herein provide adaptable optoelectronic components that are capable of repeatably implementing emerging laser fiber welding techniques.

Optical Communication Devices with Selective Signal Preclusion

Figure 1:
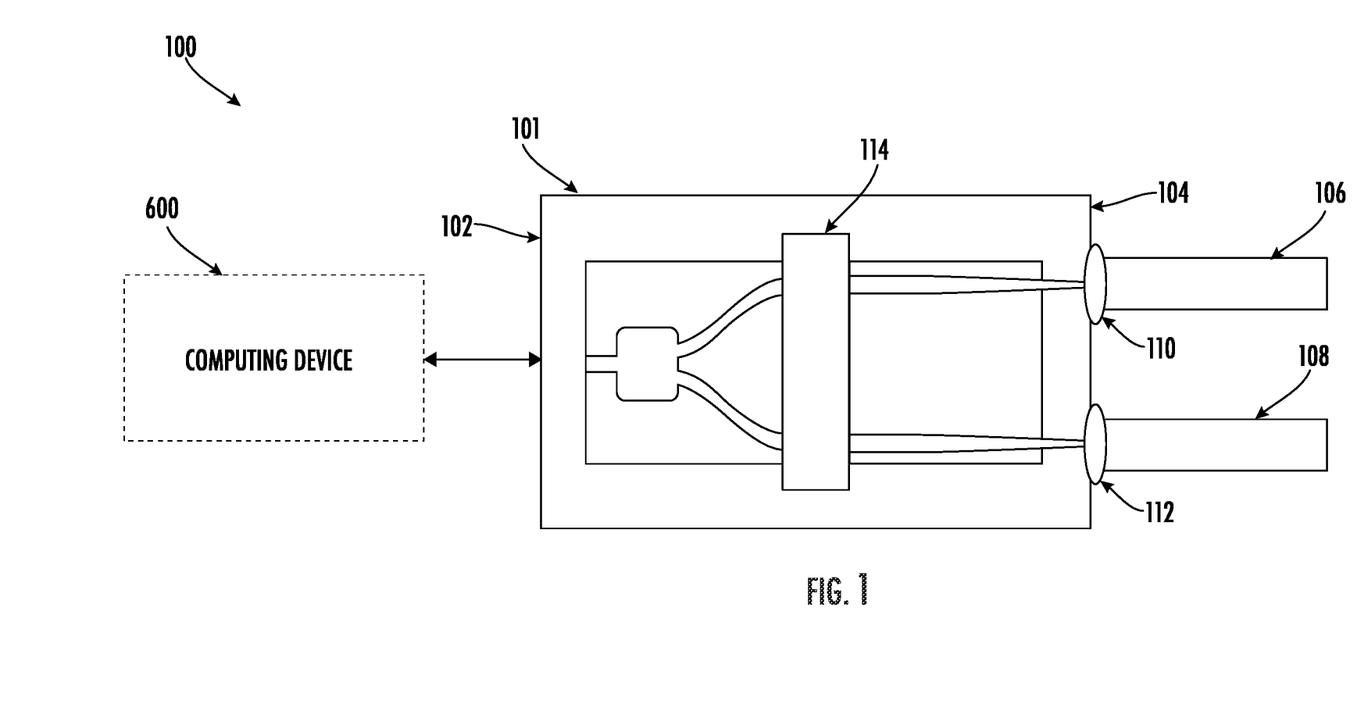
FIG. 1 illustrates an example optical communication device and signal preclusion component in accordance with some embodiments described herein.
Figure 6:
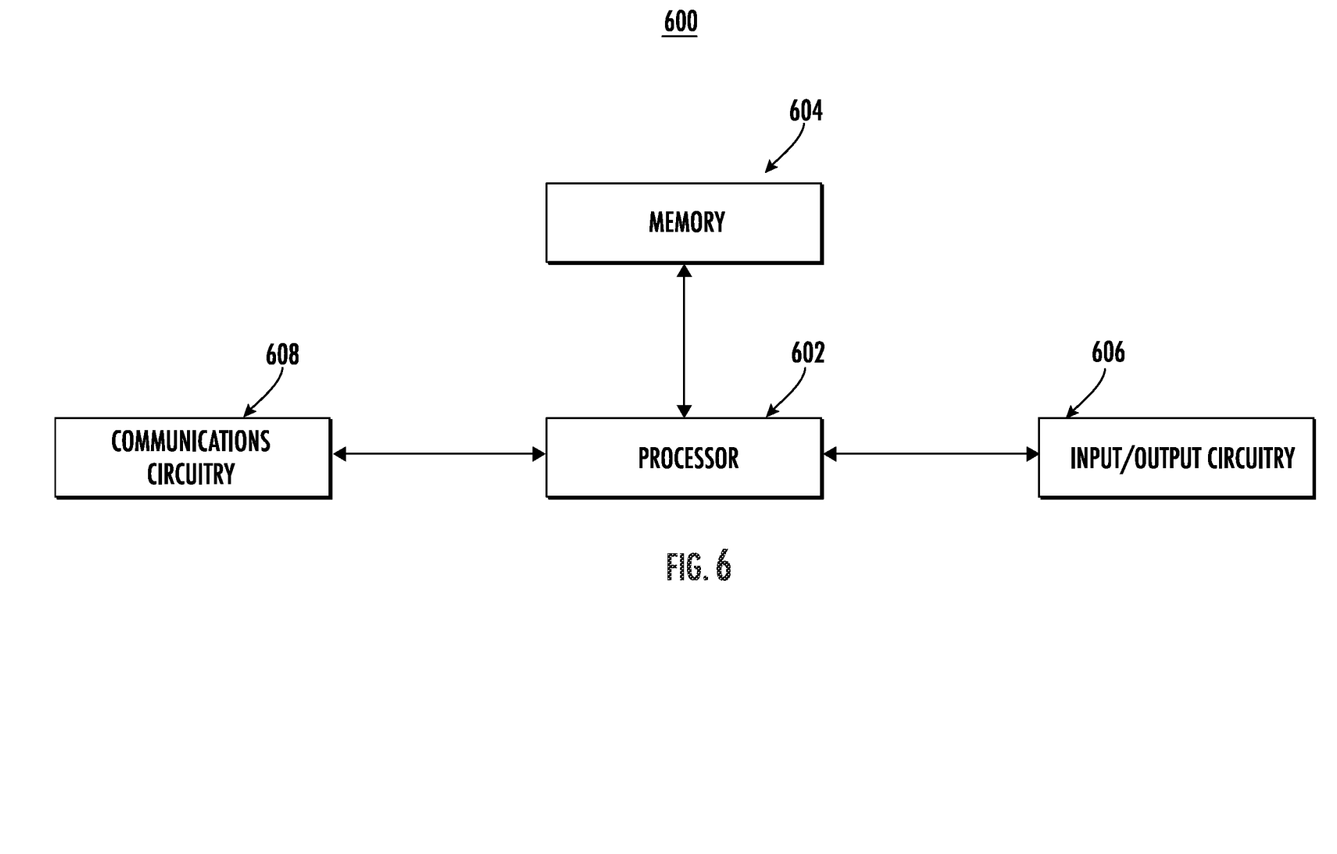
FIG. 6 illustrates a schematic block diagram of an example computing device that may perform various operations, in accordance with some example embodiments described herein.

With reference to FIG. 1, an optical communication device 100 is illustrated. As shown, the optical communication device 100 may include a substrate 101 that defines a first end 102 and a second end 104. The substrate 101 may comprise a printed circuit board (PCB) configured to provide electrical communication to various components (e.g., signal preclusion component 114, transceivers (not shown), and/or other optoelectronic components) supported thereon as part of a PIC implementation (e.g., the optical communication device 100 operates as a PIC). The substrate 101 (e.g., the PCB) may, in some embodiments, comprise a dielectric material, a glass material, a polymer material, an amorphous material, a semiconductor material, and/or the like. Said differently, the present disclosure contemplates that the substrate 101 (e.g., the PCB) may comprise any material configured for use with optoelectronic components and/or configured to define or support electrical connection elements or features (e.g., wires, traces, etc.) to provide electrical connectivity between optoelectronic components. Furthermore, the substrate 101 may further support one or more circuitry components, such as shown in FIG. 6, of a computing device 600 (e.g., Central Processing Unit (CPU), Graphics Processing Unit (GPU), or the like).

The substrate 101 may define a first end 102 and a second end 104 that may be, as shown, positioned opposite the first end 102. By way of example, the substrate 101 may define a rectangular cross-sectional shape such that the first end 102 is substantially parallel with respect to the second end 104. Although illustrated and described herein with reference to a first end 102 and a second end 104 that are positioned on opposing ends of a rectangular substrate 101, the present disclosure contemplates that the substrate 101 may be dimensioned (e.g., sized and shaped) based upon the intended application of the optical communication device 100. Furthermore, the substrate 101 may define any number of ends located at any relative position or orientation based upon the intended application of the optical communication device 100.

As described herein, the optical communication device 100 may be configured to facilitate the transmission of optical signals, such as between the first end 102 and the second end 104 and/or to optoelectronic components coupled thereto. In the embodiments of FIGS. 1-5, the transmission of optical signals (e.g., the partial or selective preclusion thereof) is described a transmitting from the first end 102 of the substrate 101 to the second end 104 of the substrate 101. By way of example, an optical signal generated by an optoelectronic component (e.g., optical transceiver or the like) may be received by the first end 102 of the substrate 101 and transmitted to the second end 104 of the substrate 101 for further transmission by a primary optical communication medium 106 or by a secondary optical communication medium 108. The present disclosure, however, contemplates that the optical signals of the optical communication device 100 may equally be transmitted from the second end 104 of the substrate 101 to the first end 102 of the substrate 101. Said differently, each of the embodiments described hereafter may facilitate and selectively preclude the transmission of optical signals traveling in any direction based upon the intended application of the optical communication device 100.

With continued reference to FIG. 1, the optical communication device 100 may include a primary optical communication medium 106 attached to the second end 104 of the substrate 101. As described above, the primary optical communication medium 106 may be welded 110 (e.g., via a laser welding technique or otherwise) to the second end 104 of the substrate 101. The primary optical communication medium 106 may define a structure by which optical signals (e.g., light) are transmitted. By way of a particular example, the primary optical communication medium 106 may include an optical fiber that is laser welded 110 at the second end 104 of the substrate 101. Although described herein with reference to example optical fibers, the present disclosure contemplates that the primary optical communication medium 106 may include any structure through which optical signals (e.g., light) may propagate.

Figure 7:
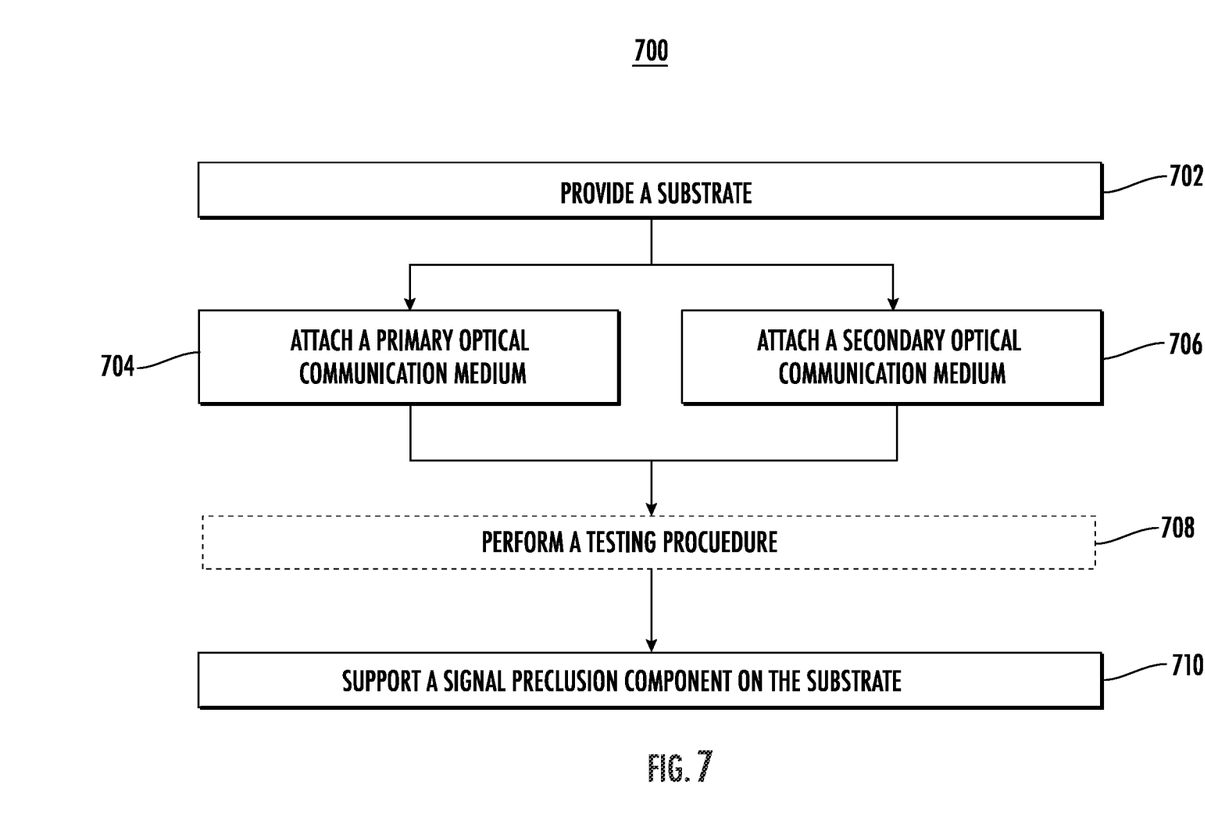
FIG. 7 is a flowchart illustrating a method of manufacturing an optical communication device according to an example embodiment.

As described hereafter with reference to the method of FIG. 7, during manufacture of the optical communication device 100, the primary optical communication medium 106 may be the default or intended communication medium for optical signals. In some instances, however, the primary optical communication medium 106 may be unsuitable for optical signal transmission, such as due to an error in the laser welding of the primary optical communication medium 106 to the substrate 101. To provide redundancy and resiliency and ensure that the optical communication device 100 may continue to operate in instances in which the primary optical communication medium 106 is inoperable or otherwise unsuitable of optical signal transmission, the optical communication device 100 may further include a secondary optical communication medium 108.

The secondary optical communication medium 108 may also be attached to the second end 104 of the substrate 101. Similar to the primary optical communication medium 106, the secondary optical communication medium 108 may be welded 110 (e.g., via a laser welding technique or otherwise) to the second end 104 of the substrate 101. The secondary optical communication medium 108 may define a structure by which optical signals (e.g., light) are transmitted. By way of a particular example, the secondary optical communication medium 108 may include an optical fiber that is laser welded 112 at the second end 104 of the substrate 101. Although described herein with reference to example optical fibers, the present disclosure contemplates that the secondary optical communication medium 108 may include any structure through which optical signals (e.g., light) may propagate.

As shown in FIG. 1, the optical communication device 100 may further include a signal preclusion component 114 supported by the substrate 101. The signal preclusion component 114 may be configured to selectively preclude signal transmission of optical signals received via the first end 102 to either the primary optical communication medium 106 or the secondary optical communication medium 108. As described above, the optical communication device 100 may include a pair of optical communication mediums 106, 108 welded to the substrate 101 so as to provide for the ability to select a particular optical communication medium by precluding signal transmission to the other of the optical communication medium pair. As described hereafter with reference to FIG. 7, for example, the optical communication device 100 may be subjected to a testing procedure that determines that either the primary optical communication medium 106 or the secondary optical communication medium 108 is unsuitable for optical signal transmission. In response, the signal preclusion component 114 may operate to preclude signal transmission to this unsuitable optical communication medium. The signal preclusion component 114 may leverage polarization, phase difference, and/or other characteristics of optical communication channels to effectuate this signal preclusion as described hereafter.

In order to control operation of one or more components of the optical communication device 100, a computing device 600 communicably coupled with the optical communication device 100 may be included. As described hereafter with reference to FIG. 6, the computing device 600 may be any suitable controller, network card, GPU, microcontroller, computing device, network server, and/or other type of processing device. In some embodiments, the computing device 600 may be configured to subject the optical communication device 100 to a testing procedure in order to determine which of the optical communication mediums 106, 108 are suitable for optical signal transmission.

Figure 2:
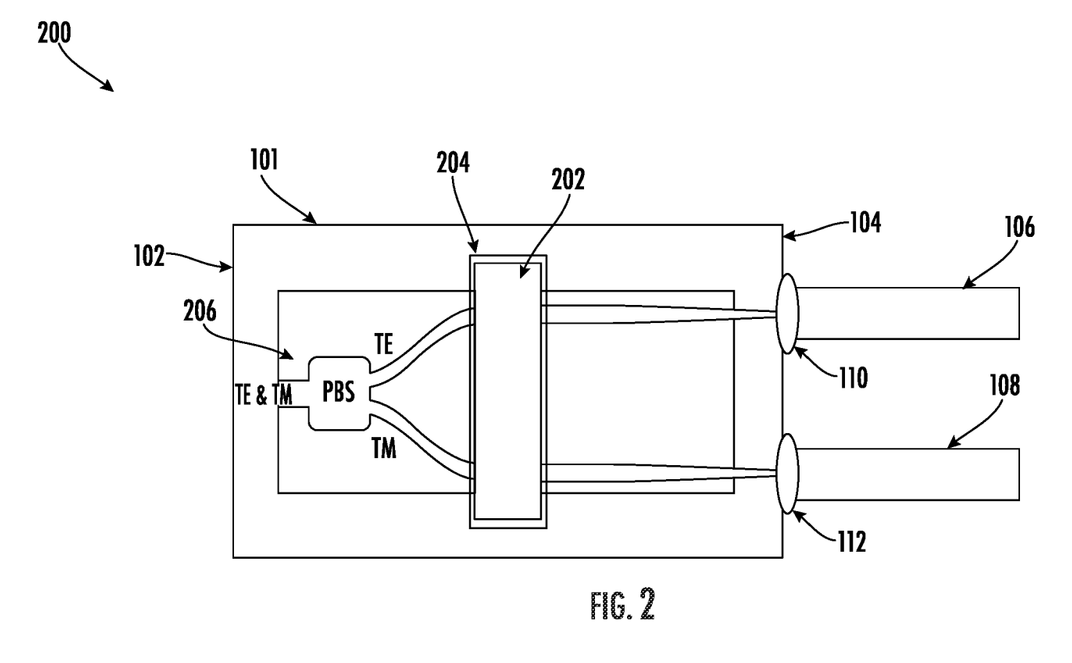
FIG. 2 illustrates an example optical communication device with a thin-film element-based signal preclusion component in accordance with some embodiments described herein.

With reference to FIG. 2, an example optical communication device 200 with a thin-film element-based signal preclusion component 202 is illustrated. A thin-film element 202 (e.g., an example signal preclusion component) may refer to an optical thin-film material that may leverage light interference conditions to separate components of optical signals, modify the optical path of an optical signals, filter selected wavelengths of optical signals, and/or the like. In order to support the thin-film element 202, the substrate 101 may define a slot 204 between the first end 102 and the second end 104 within which the thin-film element 202 is disposed. In the example embodiment of FIG. 2, the primary optical communication medium 106 may be associated with a primary polarization of the thin-film element 202 (e.g., the signal preclusion component), and the secondary optical communication medium 108 may be associated with a secondary polarization of the thin-film element 202 (e.g., the signal preclusion component). In such an embodiment, the thin-film element 202 (e.g., the signal preclusion component) may selectively preclude transmission of optical signals to the primary optical communication medium 106 by setting the polarization of the thin-film element 202 (e.g., the signal preclusion component) to the secondary polarization associated with the secondary optical communication medium 108. Alternatively, the thin-film element 202 (e.g., the signal preclusion component) may selectively preclude transmission of optical signals to the secondary optical communication 108 medium by setting the polarization of the thin-film element 202 (e.g., the signal preclusion component) to the primary polarization associated with the primary optical communication medium 106.

By way of a particular example, the optical communication device 200 may include a polarization beam splitter (PBS) that receives an optical signal having a transverse magnetic mode (TM) and a transverse electric mode (TE). In order to direct optical signals to and from the primary optical communication medium 106 and preclude optical signal transmission to and from the secondary optical communication medium 108, the thin-film element 202 may be a zero-degree waveplate that sets the polarization associated with the signal preclusion component as the primary polarization of the primary optical communication medium 106. In order to direct optical signals to and from the secondary optical communication medium 108 and preclude optical signal transmission to and from the primary optical communication medium 106, the thin-film element 202 may be a polyimide half waveplate that sets the polarization associated with the signal preclusion component as the secondary polarization of the secondary optical communication medium 108.

Figure 3:
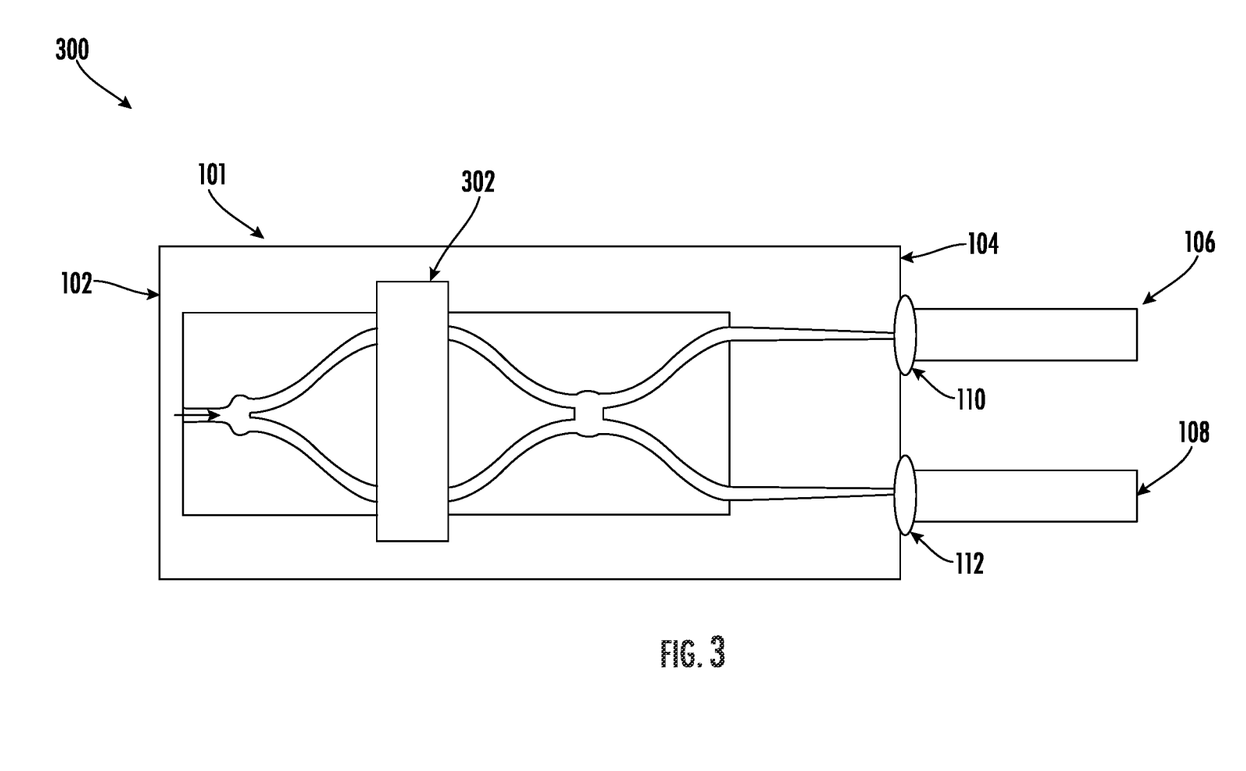
FIG. 3 illustrates another example optical communication device with a thin-film element-based signal preclusion component in accordance with some embodiments described herein.

With reference to FIG. 3, another example optical communication device 300 with a thin-film element-based signal preclusion component 302 is illustrated. The optical communication device 300 may leverage an example thin-film element 302 with phase difference in order to selectively preclude signal transmission. In some embodiments, the primary optical communication medium 106 may be associated with a primary state of the thin-film element 302 (e.g., signal preclusion component) set by a primary phase difference, and the secondary optical communication medium 108 may be associated with a secondary state of the thin-film element 302 (e.g., signal preclusion component) set by a secondary phase difference. In such an embodiment, the thin-film element 302 (e.g., signal preclusion component) may selectively preclude transmission of optical signals to the primary optical communication medium 106 by selecting the secondary phase difference and setting the thin-film element 302 (e.g., signal preclusion component) to the secondary state associated with the secondary optical communication medium 108. Alternatively, the thin-film element 302 (e.g., signal preclusion component) may selectively preclude transmission of optical signals to the secondary optical communication medium 108 by selecting the primary phase difference and setting the thin-film element 302 (e.g., signal preclusion component) to the primary state associated with the primary optical communication medium 106. In other words, the signal preclusion component (e.g., thin-film element 302) may operate as a Mach-Zehnder Interferometer to determine the relative phase shift and set the phase shift based upon the suitable optical communication medium 106, 108.

Figure 4:
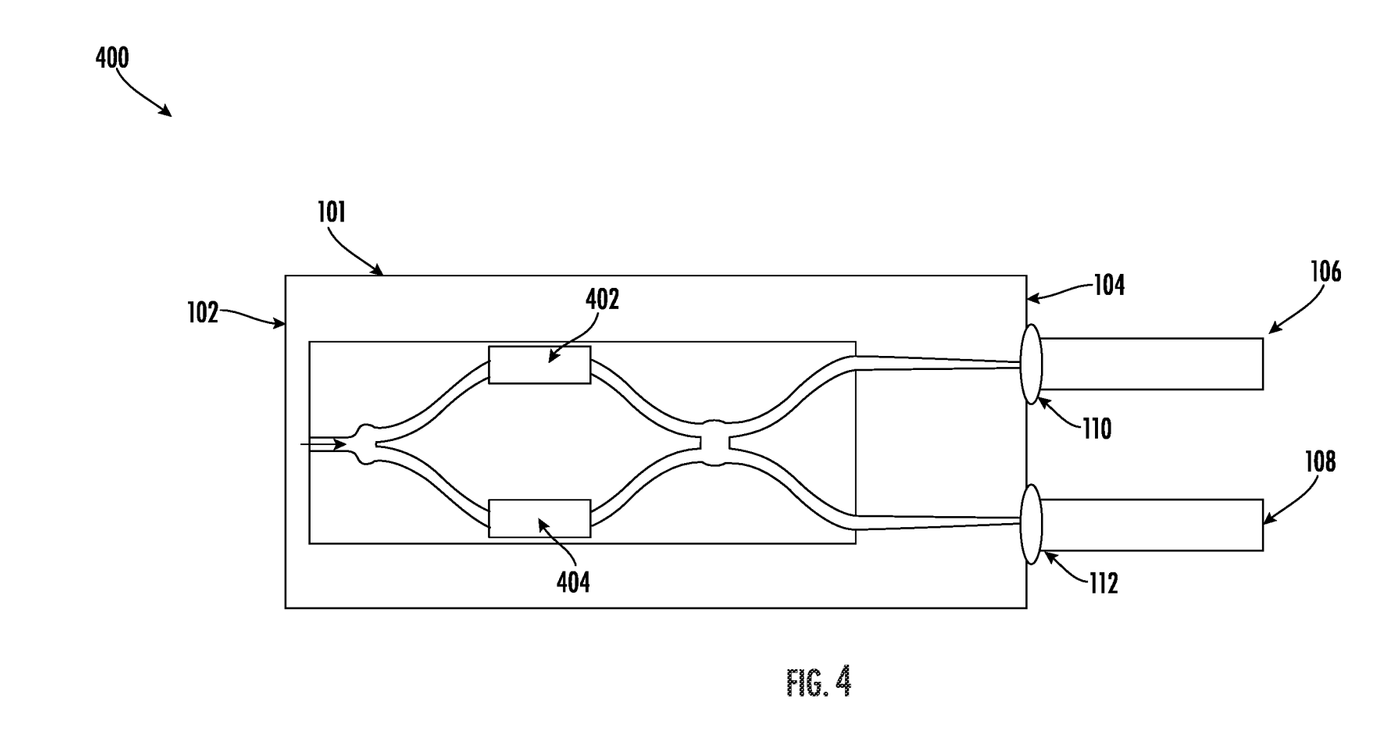
FIG. 4 illustrates an example optical communication device with a control heater-based signal preclusion component in accordance with some embodiments described herein.

With reference to FIG. 4, an example optical communication device 400 with a control heater-based signal preclusion component 402, 404 is illustrated. Similar to the operation of the signal preclusion component 302 of FIG. 3, the control heaters (e.g., first control heater 402 and second control heater 404) may operate to selectively preclude optical signal transmission via phase difference. For example, the primary optical communication medium 106 may be is associated with a primary state of the control heaters 402, 404 (e.g., the signal preclusion component) set by a primary phase difference, and the secondary optical communication medium 108 may be associated with a secondary state of the control heaters 402, 404 (e.g., the signal preclusion component) set by a secondary phase difference. In such an embodiment, the control heaters 402, 404 (e.g., the signal preclusion component) may selectively preclude transmission of optical signals to the primary optical communication medium 106 by, via the control heaters 402, 404, selecting the secondary phase difference and setting the signal preclusion component to the secondary state associated with the secondary optical communication medium 108. Alternatively, the control heaters 402, 404 (e.g., the signal preclusion component) may selectively preclude transmission of optical signals to the secondary optical communication medium 108 by, via the control heaters 402, 404, selecting the primary phase difference and setting the preclusion component to the primary state associated with the primary optical communication medium 106. In some instances, operation of the first control heater and the second control heater may be controlled by the computing device 200.

Figure 5:
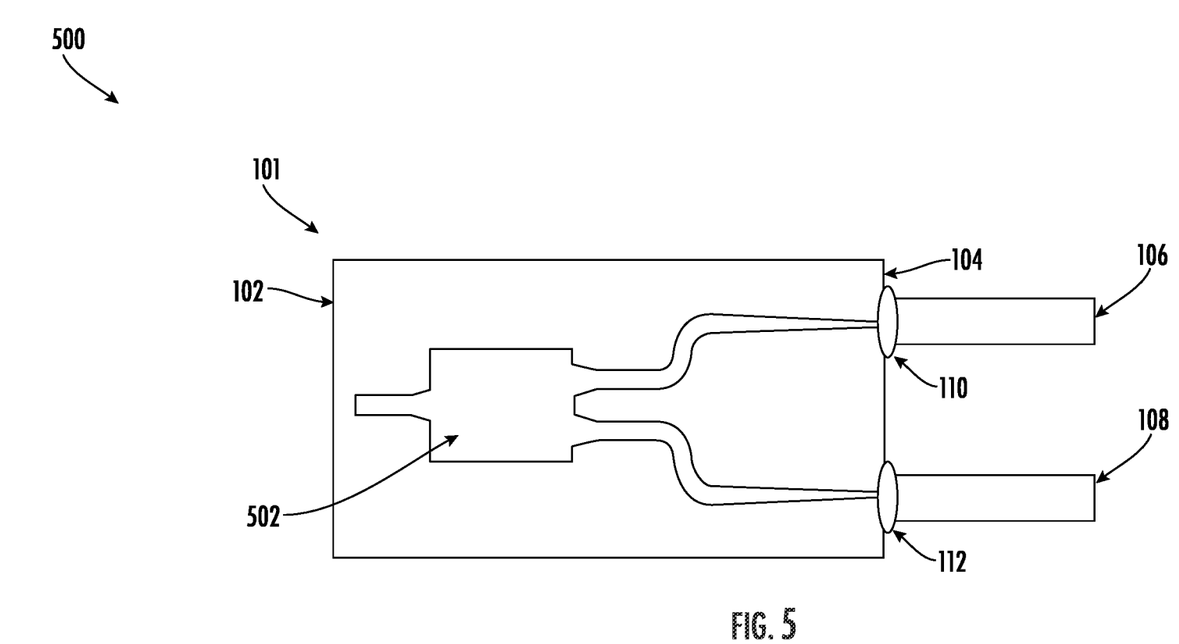
FIG. 5 illustrates an example optical communication device with a multimode interference (MMI) coupler-based signal preclusion component in accordance with some embodiments described herein.

With reference to FIG. 5, an example optical communication device 500 with a multimode interference (MMI) coupler-based signal preclusion component 502 is illustrated. As shown, the MMI coupler 502 (e.g., the signal preclusion component) may operate to passively split to combine the two optical paths associated with the primary optical communication medium 106 and the secondary optical communication medium 108. In such an embodiment, a theoretical loss (e.g., 3 dB or the like) may be associated with the use of a passive splitter (e.g., the MMI coupler 502).

Example Computing Device

The computing device 600 may include circuitry, networked processors, or the like configured to perform some or all of the apparatus-based (e.g., signal preclusion-based) processes described herein and may be any suitable controller, network card, graphical processing unit (GPU), microcontroller, computing device, network server, and/or other type of processing device. In this regard, the computing device 600 may be embodied by any of a variety of devices. For example, the computing device 600 may be configured to receive/transmit data and may include any of a variety of fixed terminals, such as a server, microcontroller, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 6 and described in connection therewith. Despite the many arrangements contemplated herein, the computing device 600 is shown and described herein as a single computing device for ease of explanation and to avoid unnecessarily overcomplicating the disclosure.

As illustrated in FIG. 6, the computing device 600 may include a processor 602, a memory 604, communications circuitry 608, and input/output circuitry 606. The computing device 600 may be configured to execute some of the operations described below in connection with FIG. 7. Although components 602-608 are described in some cases using functional language, it should be understood that the particular implementations necessarily include the use of particular hardware. It should also be understood that certain of these components 602-608 may include similar or common hardware. For example, two sets of circuitry may both leverage use of the same processor 602, memory 604, communications circuitry 608, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 600 may be housed within the optical communication device 100. It will be understood in this regard that some of the components described in connection with the computing device 600 may be housed within one of these devices, while other components may be housed within another of these devices, or by yet another device not expressly illustrated in FIGS. 1-5.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 600 may provide or supplement the functionality of particular circuitry.

In some embodiments, the processor 602 (and/or co-processor or any other processing circuitry assisting or otherwise associated with the processor) may be in communication with the memory 604 via a bus for passing information among components of the computing device 600. The memory 604 may be non-transitory and may include, for example, one or more volatile and/or non-volatile memories. For example, the memory may be an electronic storage device (e.g., a non-transitory computer readable storage medium). The memory 604 may be configured to store information, data, content, applications, instructions, or the like, for enabling the computing device 600 to carry out various functions in accordance with example embodiments of the present disclosure.

The processor 602 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the security circuitry, and/or remote or "cloud" processors.

In an example embodiment, the processor 602 may be configured to execute instructions stored in the memory 604 or otherwise accessible to the processor 602. Alternatively, or additionally, the processor 602 may be configured to execute hard-coded functionality. As such, whether configured by hardware or by a combination of hardware with software, the processor 602 may represent an entity (e.g., physically embodied in circuitry) capable of performing operations according to an embodiment of the present disclosure while configured accordingly. Alternatively, as another example, when the processor 602 is embodied as an executor of software instructions, the instructions may specifically configure the processor 602 to perform the algorithms and/or operations described herein when the instructions are executed.

The computing device 600 may further include input/output circuitry 606 that may, in turn, be in communication with the processor 602 to provide output to a user and to receive input from a user, user device, or another source. In this regard, the input/output circuitry 606 may comprise a display that may be manipulated by an application. In some embodiments, the input/output circuitry 606 may also include additional functionality such as a keyboard, a mouse, a joystick, a touch screen, touch areas, soft keys, a microphone, a speaker, or other input/output mechanisms. The computing device 600 comprising the processor 602 may be configured to control one or more functions of a display through computer program instructions (e.g., software and/or firmware) stored on a memory accessible to the processor (e.g., the memory 604 and/or the like).

The communications circuitry 608 may be any means such as a device or circuitry embodied in either hardware or a combination of hardware and software that is configured to receive and/or transmit data from/to a network and/or any other device, circuitry, or module in communication with the computing device 600. In this regard, the communications circuitry 608 may include, for example, a network interface for enabling communications with a wired or wireless communication network. For example, the communications circuitry 608 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the computing device 600 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

Example Methods of Manufacturing

Turning next to FIG. 7, a flowchart is a method of manufacturing an optical communication device according to an example embodiment. The operations illustrated in FIG. 7 may, for example, be performed by, with the assistance of, and/or under the control of an apparatus (e.g., computing device 600), as described above. In this regard, performance of the operations may invoke one or more of processor 602, memory 604, and/or input/output circuitry 606, communications circuitry 608.

As shown in operation 702, the method 700 may include providing a substrate. As described above, the substrate may comprise a printed circuit board (PCB) configured to provide electrical communication to various components thereon as part of a PIC implementation. The substrate (e.g., the PCB) may, in some embodiments, comprise a dielectric material, a glass material, a polymer material, an amorphous material, a semiconductor material, and/or the like. Said differently, the present disclosure contemplates that the substrate (e.g., the PCB) may comprise any material configured for use with optoelectronic components and/or configured to define or support electrical connection elements or features (e.g., wires, traces, etc.) to provide electrical connectivity between optoelectronic components. The substrate may define a first end and a second end that may be positioned opposite the first end 102.

Thereafter, as shown in operations 704 and 706, the method 700 may include attaching a primary optical communication medium to the second end and attaching a secondary optical communication medium to the second end. As described above, the primary optical communication medium may be welded (e.g., via a laser welding technique or otherwise) to the second end of the substrate and may define a structure by which optical signals (e.g., light) are transmitted. The secondary optical communication medium may also be attached to the second end of the substrate. Similar to the primary optical communication medium, the secondary optical communication medium may be welded (e.g., via a laser welding technique or otherwise) to the second end of the substrate and may define a structure by which optical signals (e.g., light) are transmitted.

In some embodiments, as shown in operation 708, the method 700 may include performing a testing procedure on the primary optical communication medium and selecting the signal preclusion component based on the testing procedure. As described above, in some instances, however, the primary optical communication medium may be unsuitable for optical signal transmission, such as due to an error in the laser welding of the primary optical communication medium to the substrate. To provide redundancy and resiliency and ensure that the optical communication device may continue to operate in instances in which the primary optical communication medium is inoperable or otherwise unsuitable of optical signal transmission, the optical communication device may further include a secondary optical communication medium 108. The testing procedure may leverage any technique applicable to optical communication devices in order to determine if the primary optical communication medium is capable of properly transmitting optical signals.

Thereafter, as shown in operation 710, the method may include supporting a signal preclusion component by the substrate. As described above with reference to FIGS. 1-5, the signal preclusion component configured to selectively preclude signal transmission of optical signals received via the first end to either the primary optical communication medium or the secondary optical communication medium. In some embodiments, the signal preclusion component may include a thin-film element configured to selectively preclude signal transmission based upon a phase difference or a polarization set by the signal preclusion components described above with reference to FIGS. 2-3. In some embodiments, the signal preclusion component may include a plurality of control heaters including at least a first control heater and a second control heater configured to selectively preclude signal transmission set by the signal preclusion component as described above with reference to FIG. 4. In some embodiments, the signal preclusion component may include a multimode interference (MMI) coupler configured to passively direct the optical signals to either the primary optical communication medium or the secondary optical communication medium as described above with reference to FIG. 5.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of any optical component or optoelectronic element. In addition, the method described above may include fewer steps in some cases, while in other cases may include additional steps. Modifications to the steps of the method described above, in some cases, may be performed in any order and in any combination.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An optical communication device comprising:
    a substrate defining:
        a first end; and
        a second end;
    a primary optical communication medium welded to the second end;
    a secondary optical communication medium welded to the second end;
    a signal preclusion component supported by the substrate and configured to selectively preclude signal transmission of optical signals received via the first end to either the primary optical communication medium or the secondary optical communication medium such that either the precluded first optical communication medium or the precluded second optical communication medium is incapable of optical signal transmission; and
    a polarization beam splitter (PBS) supported by the substrate and positioned between the first end and the signal preclusion component.

2. The optical communication device according to claim 1, wherein the signal preclusion component comprises a thin-film element.

3. The optical communication device according to claim 2, wherein the substrate further defines a slot between the first end and the second end within which the thin-film element is disposed.

4. The optical communication device according to claim 2, wherein the primary optical communication medium is associated with a primary polarization of the signal preclusion component, and the secondary optical communication medium is associated with a secondary polarization of the signal preclusion component, the signal preclusion component further configured to:
    selectively preclude transmission of optical signals to the primary optical communication medium by setting the polarization of the signal preclusion component to the secondary polarization associated with the secondary optical communication medium.

5. The optical communication device according to claim 4, wherein the thin-film element comprises a polyimide half waveplate.

6. The optical communication device according to claim 2, wherein the primary optical communication medium is associated with a primary polarization of the signal preclusion component, and the secondary optical communication medium is associated with a secondary polarization of the signal preclusion component, the signal preclusion component further configured to:
    selectively preclude transmission of optical signals to the secondary optical communication medium by setting the polarization of the signal preclusion component to the primary polarization associated with the primary optical communication medium.

7. The optical communication device according to claim 6, wherein the thin-film element comprises a zero-degree waveplate.

8. The optical communication device according to claim 1, wherein optical signal preclusion is responsive to a determination that either the precluded first optical communication medium or the precluded second optical communication medium is unsuitable for optical signal transmission or inoperable.

9. A method of manufacturing an optical communication device, the method comprising:
    providing a substrate defining:
        a first end; and
        a second end;
    welding a primary optical communication medium to the second end;
    welding a secondary optical communication medium to the second end;
    supporting a signal preclusion component by the substrate, the signal preclusion component configured to selectively preclude signal transmission of optical signals received via the first end to either the primary optical communication medium or the secondary optical communication medium such that either the precluded first optical communication medium or the precluded second optical communication medium is incapable of optical signal transmission; and
    supporting a polarization beam splitter (PBS) by the substrate positioned between the first end and the signal preclusion component.

10. The method according to claim 9, wherein, prior to supporting the signal preclusion component, the method further comprises:
    performing a testing procedure on the primary optical communication medium; and selecting the signal preclusion component based upon the testing procedure.

11. The method according to claim 9, wherein the signal preclusion component comprises a thin-film element configured to selectively preclude signal transmission based upon a phase difference or a polarization set by the signal preclusion component.

\* \* \* \* \*